United States Patent [19]

Bianco

[11] Patent Number: 5,742,432
[45] Date of Patent: Apr. 21, 1998

[54] APPARATUS FOR MANUFACTURE OF DIFFRACTION GRATINGS FOR IDENTIFICATION MEANS

[76] Inventor: James S. Bianco, 217 Brainard Rd., Enfield, Conn. 06082

[21] Appl. No.: 962,931

[22] Filed: Oct. 19, 1992

Related U.S. Application Data

[63] Continuation-in-part of Ser. No. 957,882, Oct. 7, 1992, abandoned, which is a continuation-in-part of Ser. No. 921,460, Jul. 28, 1992, abandoned, which is a continuation-in-part of Ser. No. 857,729, Mar. 26, 1992, abandoned, which is a continuation-in-part of Ser. No. 810,483, Dec. 19, 1991, abandoned.

[51] Int. Cl.$^6$ ............................. G02B 5/18; B29C 43/46; B29D 17/00
[52] U.S. Cl. ................... 359/566; 359/2; 425/183; 425/194; 425/363
[58] Field of Search .............. 359/2, 566; 264/1.3, 264/2.1, 2.2, 2.3, 2.4; 283/86

[56] References Cited

U.S. PATENT DOCUMENTS

| | | | |
|---|---|---|---|
| 4,044,939 | 8/1977 | Horst et al. | 264/1.3 |
| 4,556,378 | 12/1985 | Nyfeler et al. | 264/1.3 |
| 4,933,120 | 6/1990 | D'Amato et al. | 264/1.3 |
| 4,956,214 | 9/1990 | Imataki et al. | 264/1.3 |
| 5,003,915 | 4/1991 | D'Amato et al. | 264/1.3 |
| 5,026,510 | 6/1991 | Yashima | 264/1.3 |
| 5,071,597 | 12/1991 | D'Amato et al. | 264/1.3 |
| 5,083,850 | 1/1992 | Mallik et al. | 264/1.3 |
| 5,085,514 | 2/1992 | Mallik et al. | 264/1.3 |
| 5,116,548 | 5/1992 | Mallik et al. | 264/1.3 |
| 5,173,313 | 12/1992 | Sato et al. | 264/1.3 |

FOREIGN PATENT DOCUMENTS

| | | | |
|---|---|---|---|
| 1-176518 | 7/1989 | Japan | 264/1.3 |

*Primary Examiner*—Jon W. Henry
*Attorney, Agent, or Firm*—John H. Crozier

[57] ABSTRACT

In one preferred embodiment, an apparatus for embossing diffraction patterns on a sheet, the apparatus including: an elongate, rotatable, cylindrical roll; a plurality of arcuate embossing shim segments disposed on the surface of the roll; and the embossing shim segments being rearrangeable and/or replaceable to change the pattern embossed on the sheet. In another aspect of the invention, a method of slitting, into a plurality of strips, an embossed sheet, each strip having thereon a plurality of rows of diffraction grating segments vertically spaced apart a multiple of a selected distance, the method including: providing on a portion of the sheet a plurality of index marks vertically spaced apart a multiple of the selected distance, the index marks being provided for the alignment of cutting apparatus such that the sheet will be slit so that a selected row of the segments will be disposed a desired distance from an edge of each strip. In a further aspect of the invention, a method of providing a diffraction grating element on a first substrate strip for the reading of the diffraction grating with a light source producing a spot of light and a photodetector detecting light diffracted by the diffraction grating element, the spot of light passing relative to the first substrate strip along a path parallel to an edge of the first substrate strip, the method including: placing the diffraction grating element such that the path passes substantially through the center of the diffraction grating element.

1 Claim, 6 Drawing Sheets

APPARATUS FOR MANUFACTURE OF DIFFRACTION GRATINGS FOR IDENTIFICATION MEANS

CROSS-REFERENCE TO RELATED APPLICATIONS

The present application is a continuation-in-part of U.S. application Ser. No. 07/957,882, filed Oct. 7, 1992, now abandoned, which is a continuation-in-part of U.S. application Ser. No. 07/921,460, filed Jul. 28, 1992, abandoned, which is a continuation-in part of U.S. application Ser. No. 07/857,729, filed Mar. 26, 1992, abandoned, which is a continuation-in-part of U.S. application Ser. No. 07/810,483, filed Dec. 19, 1991, abandoned.

BACKGROUND OF THE INVENTION

1. Field of the Invention

The present invention relates to identification means generally and, more particularly, but not by way of limitation, to a novel method and apparatus for manufacturing diffraction gratings for use in optical identification means and to improved methods of reading the same.

2. Background Art

In the above-referenced application Ser. No. 07/921,460, there is described the need for secure methods of verifying the authenticity of identification means such as credit cards. There is further described a method and apparatus for manufacturing secure optomagnetic identification means.

Such method and apparatus include providing identification means having thereon magnetically encoded information and an optical image, including: optically reading the optical image and magnetically reading the magnetically encoded information, providing relative position information by determining the position of the optical image relative to the position of the magnetically encoded information, encrypting the relative position information; and, magnetically encoding the relative position information on the identification means.

Verification is provided by reading encoding relative position information and determining the relative position of the optical image and the magnetically encoded information on the identification means presented. If the encoded relative position information and the presently read relative position information are identical, then the identification means is authentic.

The optical image may be a pure diffraction grating or it may be a holographic image, which is a type of diffraction grating, or it may be a combination of the two. To provide further security, the above-referenced application discloses the use of compound diffraction gratings. In any case, the use of the relative position information for authentication is possible because the optical image is placed in a different position on each identification means, or, at least, the positions are different on a large number of identification means, due to the method of manufacture of the optical images.

In the conventional manufacture of such optical images, a cylindrical embossing shim is sleeved over a rotatable roll. Then the roll is used to emboss a thin metal foil sheet or a wax coating on a release carrier sheet. In the latter process, the embossed wax coating is subsequently metallized with a vapor deposited metal such as aluminum, nickel, or chromium. If embossed sheet is to be used to produce a security tape in which there is a security strip having an optical image superjacent a magnetic layer, such as described in U.S. Pat. Nos. 4,631,222, issued Dec. 23, 1986, to Sander, and 4,684,795, issued Aug. 4, 1987, to Colgate, Jr., a layer of iron oxide particles is now placed on the embossed sheet. The embossed sheet is then slit into strips which are to be laminated to identification means such as credit cards. In that process, the strips are laminated to credit card stock and the credit cards are die cut from the stock, with each credit card bearing an embossed segment.

The shim is arranged so that the images thereon index each revolution, so that only after a number of revolutions, does the placement of the image(s) on what will be an embossed segment repeat. With a 6-inch circumference shim 18 inches long to produce 36 embossed strips ½-inch wide and an embossed segment length of 3.385-inch (including 0.5-inch waste) for credit card application, approximately 36,000 different embossed segments can be produced before duplication. If that duplication rate is unacceptable to the user of the embossed strips, it is necessary to replace the relatively expensive shim after 36,000 embossed segments have been produced.

Furthermore, when using compound diffraction gratings, there are certain discrimination problems which can interfere with accurately reading the optical image. For example, if the spot of light employed to illuminate a diffraction grating element does not fall substantially on the element, an ambiguous reading may be made.

Accordingly, it is a principal object of the present invention to provide method and apparatus for producing optical images for secure identification means in which the number of optical images produced without duplication is greatly increased over conventional methods.

It is an additional object of the invention to provide improved methods of reading optical images on identification means.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in one preferred embodiment, an apparatus for embossing diffraction patterns on a sheet, said apparatus comprising: an elongate, rotatable, cylindrical roll; a plurality of arcuate embossing shim segments disposed on the surface of said roll; and said embossing shim segments being rearrangeable and/or replaceable to change the pattern embossed on said sheet. In another aspect of the invention, a method of slitting, into a plurality of strips, an embossed sheet, each said strip having thereon a plurality of rows of diffraction grating segments vertically spaced apart a multiple of a selected distance, said method comprising: providing on a portion of said sheet a plurality of index marks vertically spaced apart a multiple of said selected distance, said index marks being provided for the alignment of cutting apparatus such that said sheet will be slit so that a selected row of said segments will be disposed a desired distance from an edge of each said strip. In a further aspect of the invention, a method of providing a diffraction grating element on a first substrate strip for the reading of said diffraction grating with a light source producing a spot of light and a photodetector detecting light diffracted by said diffraction grating element, said spot of light passing relative to said first substrate strip along a path parallel to an edge of said first substrate strip, said method comprising: placing said diffraction grating element such that said path passes substantially through the center of said diffraction grating element.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, in which.

DETAILED DESCRIPTION OF THE PREFERRED EMBODIMENTS

Figure 1:
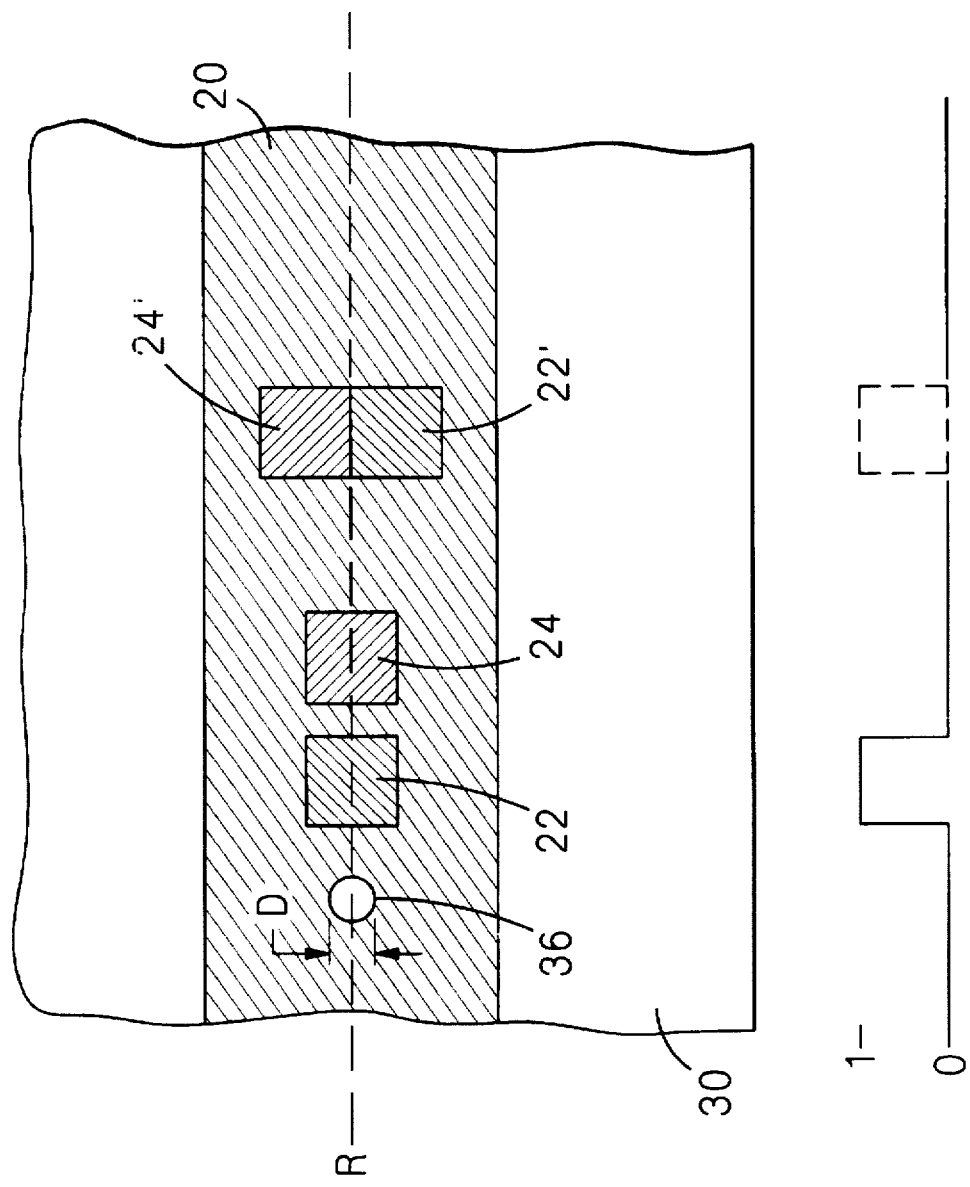
FIG. 1 is a fragmentary, top plan view of an embossed segment having diffraction gratings, illustrating the placement of diffraction grating elements thereon.

Reference should now be made to the drawing figures, in which similar or identical elements are given consistent identifying numerals throughout the various figures thereof, and in which parenthetical references to figure numbers direct the reader to the view(s) in which the element(s) being described is (are) best seen, although the element(s) may be seen also in other views.

FIG. 1 illustrates a problem with the reading of a compound diffraction grating on an embossed segment 20 disposed on a substrate 30 which may be assumed to be a credit card. Segment 20 illustrates two diffraction grating elements 22 and 24; although, the segment would normally be completely covered with diffraction grating elements. It may be assumed that element 22 can be read using a first light source (not shown) and that element 24 cannot be read by the first light source. Elements 22 and 24 may be cut from different diffraction gratings, but they may be cut from the same diffraction grating and be rotationally displaced, the latter being the case with elements 22 and 24.

Part of the process of reading embossed segment 20 includes illuminating a portion of the segment with a spot of light 36, having diameter D, as the segment moves relative to the light so that the spot of light passes across segment 20, with the center of the spot of light moving along the read line R. A spot of light in the form of an oval or other geometric configuration may be employed instead.

As shown, spot of light 36 will pass through the centers of elements 22 and 24 and produce the digital signal shown, with element 22 causing the digital electronics associated with the reading apparatus (not shown) to output a "1" and element 24 causing an output of "0".

If, however elements 22 and 24 are disposed such as elements 22' and 24', with the top edge of element 22' against read line R and the bottom edge of element 24' against the read line, the digital output will be ambiguous and may be either "1" or "0" because one-half of spot of light 36 will fall on element 22' (a read element) and the other one-half of the spot of light will fall on element 24' (a non-read element).

Figure 2:
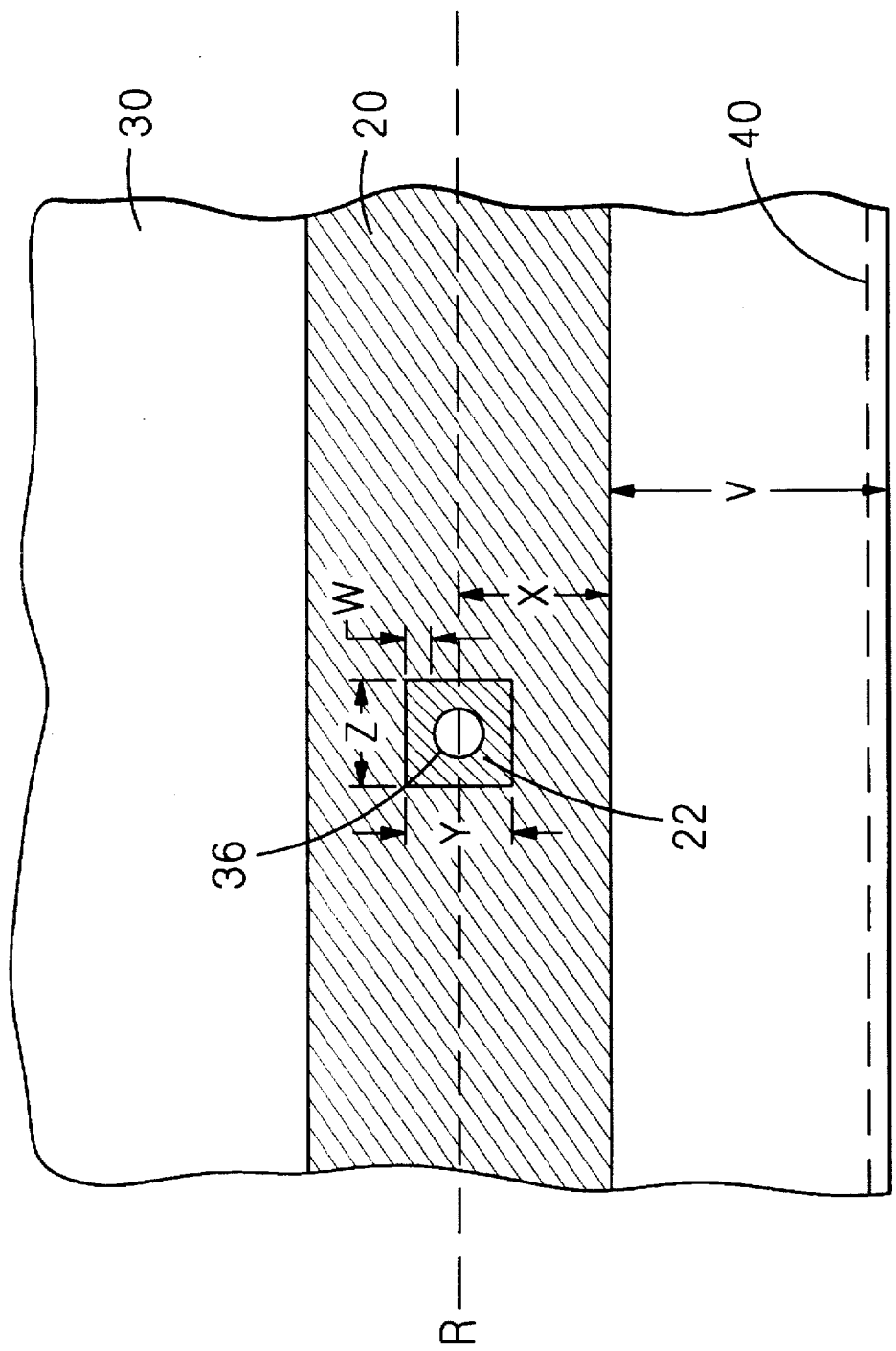
FIG. 2 is a fragmentary, top plan view of an embossed segment of diffraction grating elements, illustrating preferred relative dimensions thereof.

Referring now to FIG. 2, the solution to this problem is to have the dimension X, the distance from the bottom edge of embossed segment 20 to the center of element 22 be set so as to assure that spot of light 36 is roughly centered in element 22. The dimension V from the bottom edge of substrate 30 to the bottom edge of embossed segment 20 must also be held to a close tolerance. Holding dimensions X and V to close tolerances assures that spot of light 36 will pass through the center of 22 and through the centers of all other such segments to be read with the first light source. Other segments to be read with a second light source will be similarly positioned with respect to a read line, but the two read lines need not be congruent.

For improved reading resolution of element 22, it is also desirable to have diameter D (FIG. 1) of spot of light 36 no greater than dimension Z of the element and to have that diameter no greater than one-half of dimension Y.

A further problem with reading element 22 is that the edge of substrate 30 may wear, for example, the wearing of an identification card as it is repeatedly passed through a slot reader, so that the edge of the substrate becomes positioned at broken line 40. This decreases the distance X and eventually may start to move element 22 out of read line R. The answer to this problem is to assure that spot of light 36 initially passes across element 22 a minimum distance W from the top edge of the element, W being set so that it is at least as great as the wear expected on the edge of the substrate.

Employing the above techniques assures that spot of light 36 will always pass fully across element 22.

Figure 3:
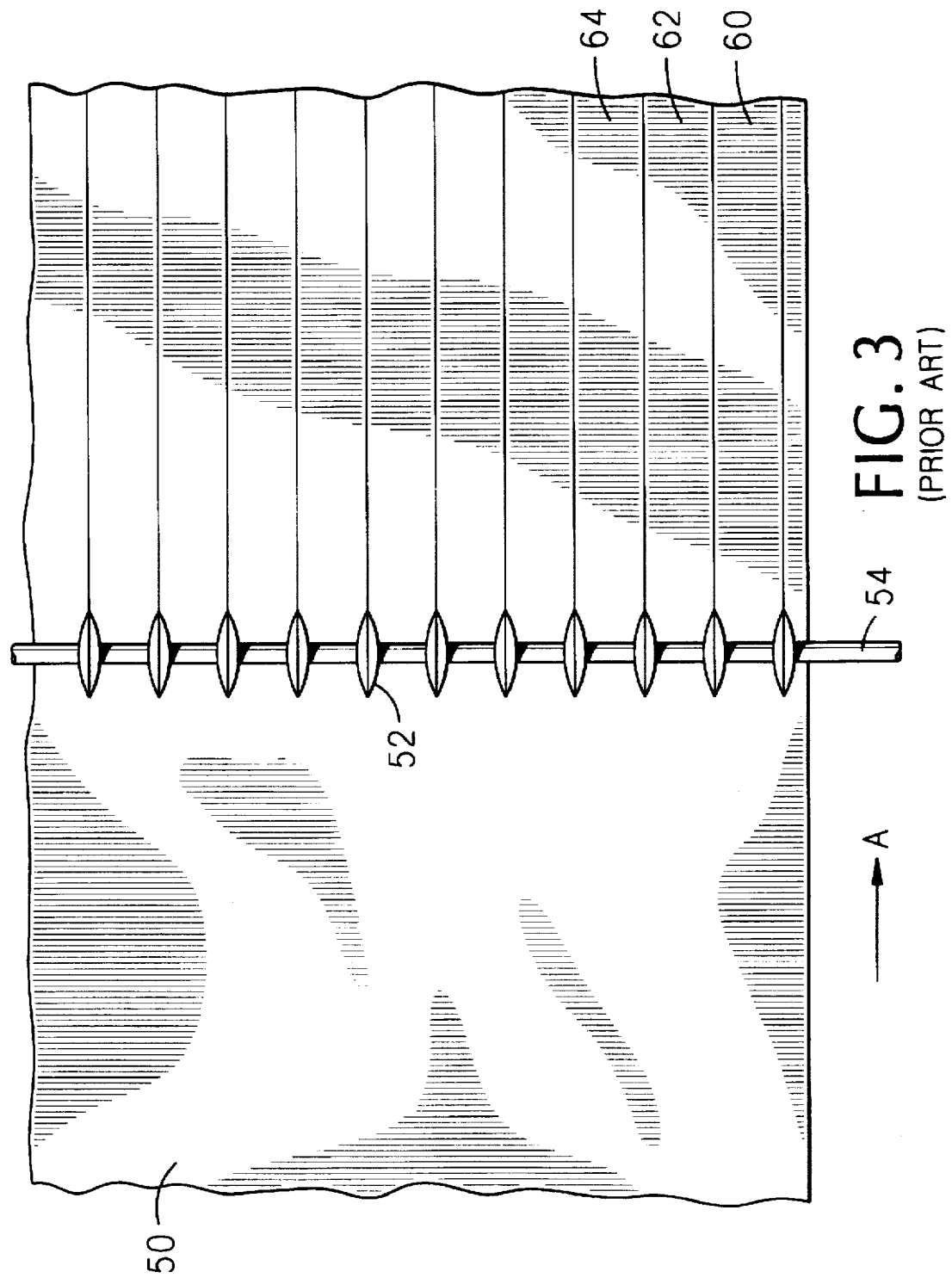
FIG. 3 is top plan view of an embossed diffraction grating sheet being slit into strips.

Reference should now be made to FIG. 3 wherein the slitting of an embossed sheet 50 is illustrated. Embossed sheet 50 is transported in the direction "A" under a plurality of knives, as at 52, mounted on a shaft 54 to produce a plurality of embossed strips, such as embossed strips 60, 62, and 64.

Figure 4:
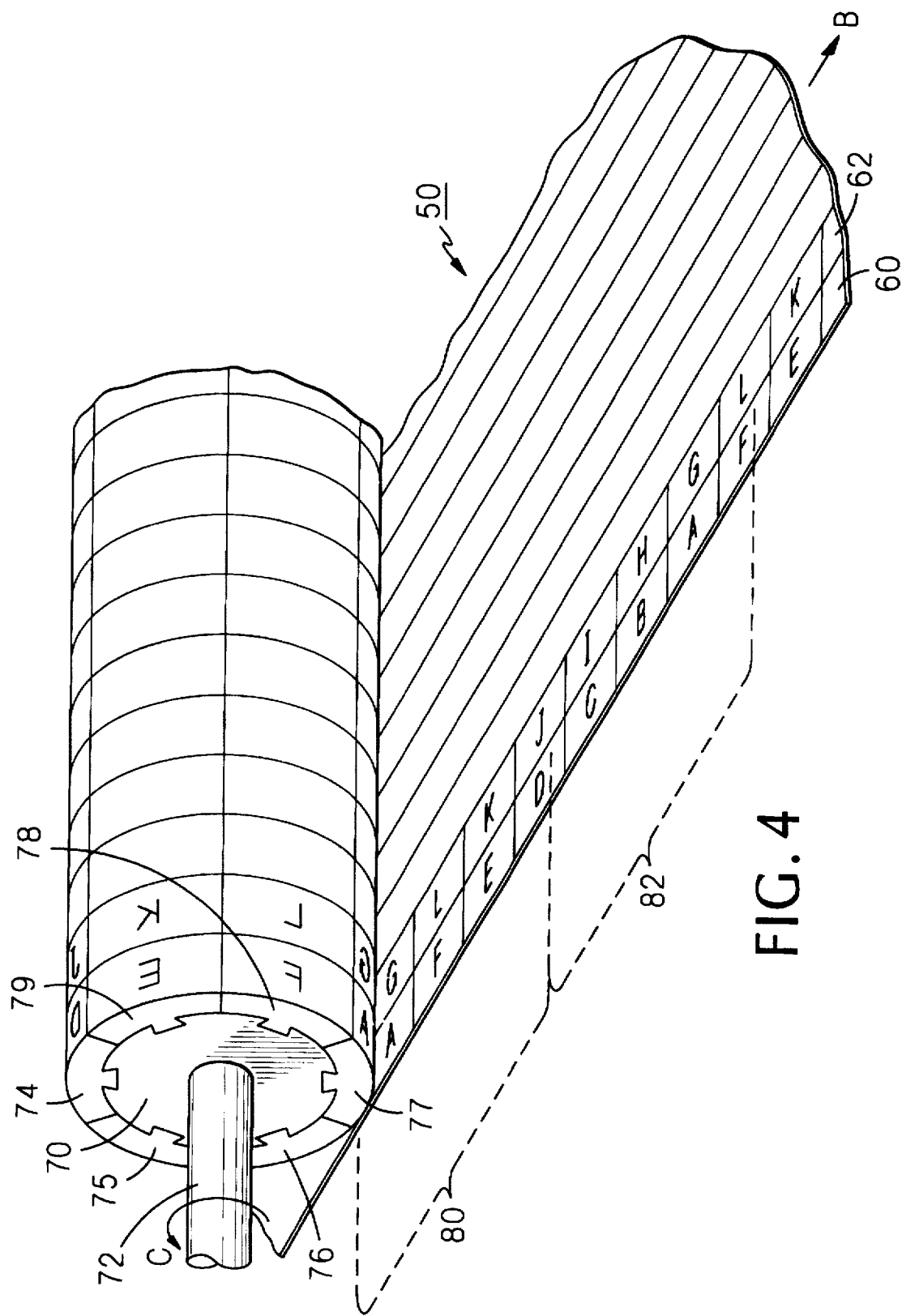
FIG. 4 is a fragmentary, perspective view of an embossed sheet being embossed according to the present invention.

Embossed sheet 50 has been embossed by the method of the invention shown on FIG. 4. Referring to that Figure, a roller 70 is fixedly mounted on a shaft 72 for rotation therewith. Dovetailed into the surface of roller 70 are six embossing shims 74–79 extending lengthwise of roller 70 and held in place axially by any suitable conventional means. On the surface of shims 74–79 are embossing patterns A, B, C, D, etc., each having thereon a unique pattern. As sheet 50 is moved in the direction "B" and shaft 72 is rotated in the direction "C", the sheet is embossed by the embossing patterns as illustrated with reference to what will become strips 60 and 62 (also FIG. 3). For the typical 3½-inch credit card application each strip will later be cut into embossed segments such as embossed segments indicated as 80 and 82 of 3.785-inch length each when the credit cards are die cut from card stock (not shown) to which embossed strip 60 will have been laminated. As noted above, with shims 74–79 having a six-inch outside diameter, a total of 36,000 one-half-inch-wide embossed segments can be produced without duplication of the patterns thereon.

In order to further increase the number of individual embossed segments produced from one set of shims 74–79, the circumferential positions of the shims on roll 70 may be rearranged by slidingly separating the dovetail joints of two or more of the shims and reinserting these in different positions, thus changing the order of the embossing patterns and greatly increasing the number of unique embossed segments that can be produced. To additionally further increase the number of individual embossed segments produced without duplication, shims 74–79 may also be switched end for end with or without changes in relative position, thus introducing new embossing patterns onto given embossed strips. Additionally, two or more of shims 74–79 may be replaced by other shims. Or, a combination of rearranging, replacing, and/or switching end for end can be employed.

A further advantage of this aspect of the invention is that embossed sheets may be customized easily. For example, one or more holographic images can be embossed on sheet 50 by replacing one or more shims 74–79 with one or more shims having thereon holographic patterns.

Figure 5:
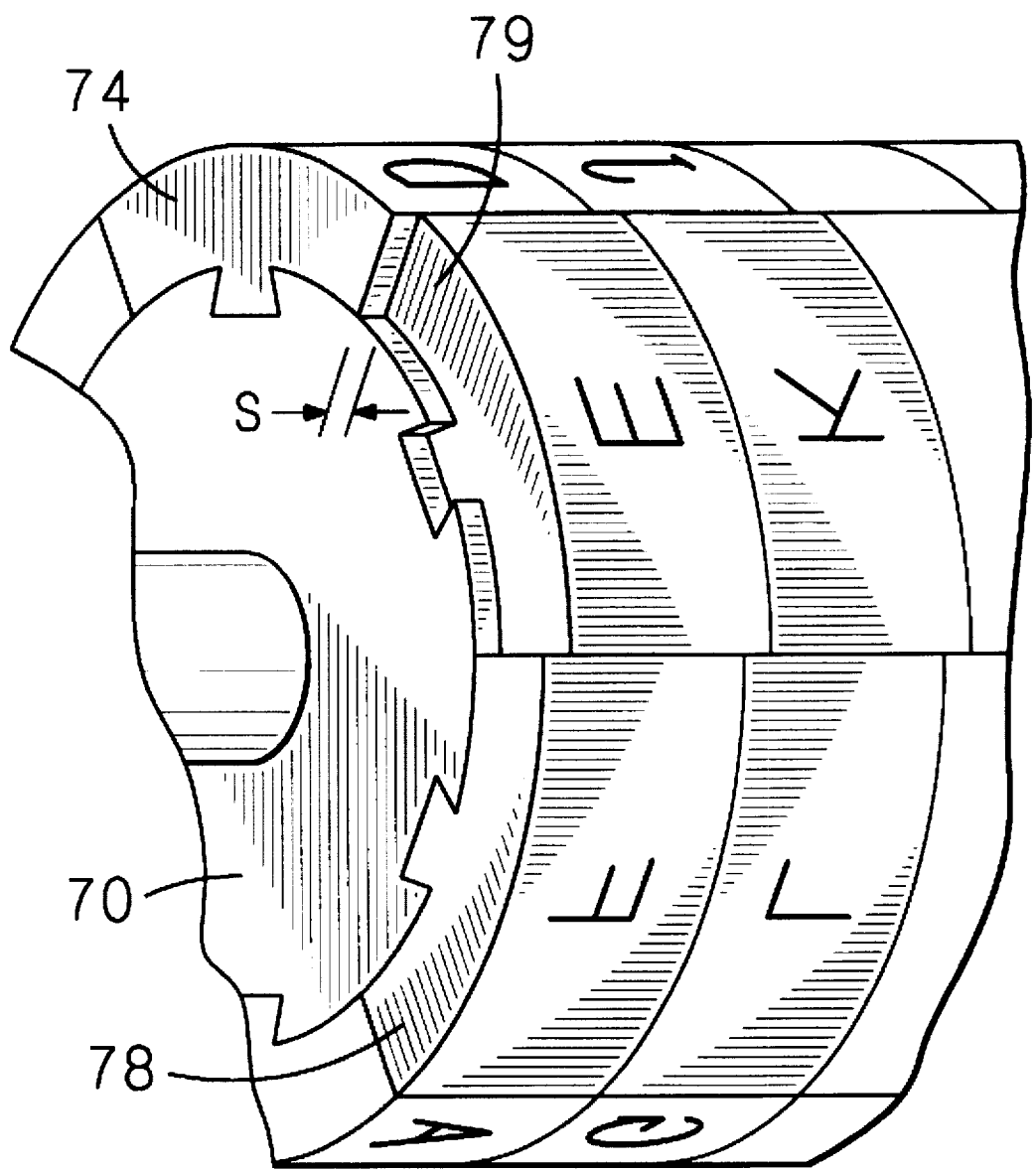
FIG. 5 is an enlarged portion of FIG. 4 illustrating another feature of the present invention.

FIG. 5 illustrates another method of increasing the number of embossed segments produced without duplication. Here, shim 79 has been axially slid along roll 70 relative to shims 74–78 by a distance S, resulting in embossing patterns C, I, etc. on shim 79 producing offset and different diffraction patterns on the embossed strips. In like manner, one or more other of the shims may be offset or may be offset distances of varying multiples of S. The significance of the distance S will be understood by reference to FIG. 6.

Figure 6:
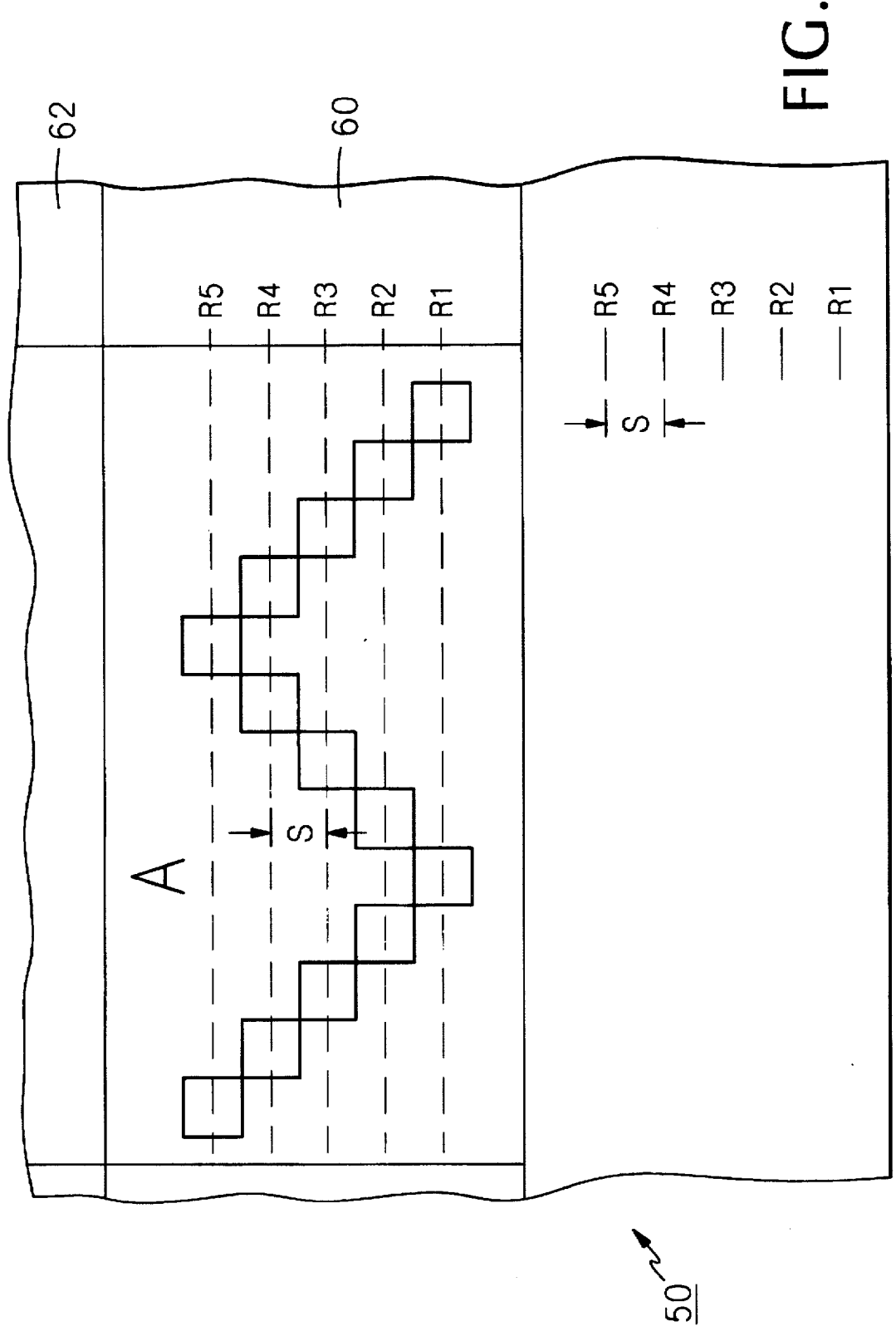
FIG. 6 is a fragmentary, enlarged, top plan view of an embossed sheet according to the present invention.

FIG. 6 illustrates yet another method of increasing the number of embossed segments that can be produced from one set of shims, this method operating in the slitting step. Here, five tick marks $R_1$–$R_5$ have been placed at the lower edge of embossed sheet 50, adjacent marks being vertically spaced apart by the distance S. On embossed strip 60 is embossed a pattern of diffraction grating elements which may be assumed, for example, to be the diffraction grating elements embossed by embossing pattern A (FIG. 4), the grating elements having centers vertically spaced apart by the distance S, the elements shown all being readable with a given light source. Thus, as shown, the vertical spacing of the tick marks corresponds to spaced apart read lines having the same "R" designations, which read lines pass through the centers of, in this case, two or three horizontally aligned diffraction grating elements. When sheet 50 is to be slit, knives 52 (FIG. 3) are aligned by means of the tick marks to slit sheet 50 such that a selected one of the read lines will be in proper position for reading when the embossed segments are placed on identification means. It will be understood that the other embossed strips on sheet 50 will have diffraction grating elements arranged in a similar manner spaced apart by the distance S. This method, without the use of any of the other techniques for increasing the number of individual embossed segments producible with a given configuration of shims 74–79, increases that number by a factor of five.

Referring again to FIG. 5, it should be noted that the distance S thereon corresponds to the distance S on FIG. 6, so that a displacement of S results in the shifting of the diffraction grating elements from one read line to the next.

Employing all the above techniques together results in the production of a virtually infinite number of unique embossed segments without having to replace a conventional cylindrical shim.

A further advantage of the present invention is that of deterring forgery. Should a potential forger gain access to, say, a copy of embossed sheet 50, the forger would be limited to producing compound diffraction gratings corresponding to the particular arrangement of shims 74–79 that produced that particular sheet. In the credit card field, the credit cards having diffraction patterns corresponding to those on stolen sheet 50 could be recalled and shims 74–79 simply rearranged to produce credit cards having a different pattern of diffraction gratings.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An apparatus for embossing diffraction patterns on a sheet, said apparatus comprising:

(a) an elongate, rotatable, cylindrical roll;

(b) a plurality of arcuate embossing shim segments disposed on the surface of said roll to embossingly contact said sheet as said roll rotates; and (c) in a first configuration, said embossing shim segments having corresponding ends terminating in a common plane and, in a second configuration, one of said embossing shim segments being axially displaced from the other of said embossing shim segments so as to vary the pattern embossed on said sheet.

\* \* \* \* \*